US012728657B2

(12) United States Patent
Chang et al.

(10) Patent No.: US 12,728,657 B2
(45) **Date of Patent: *Sep. 8, 2026**

(54) ADAPTIVE RIBBON SPEED CONTROL SYSTEMS AND METHODS

(71) Applicant: PRINTRONIX, LLC, Irvine, CA (US)

(72) Inventors: Yu-Min Grant Chang, Irvine, CA (US); Robert Ovcharenko, Orange, CA (US); Lee Fang Chong, Skudai Johor (MY); Ming Ming Yin, Commonwealth Crescent (SG)

(73) Assignee: PRINTRONIX, LLC, Irvine, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/983,059

(22) Filed: Dec. 16, 2024

(65) Prior Publication Data

US 2025/0115069 A1 Apr. 10, 2025

Related U.S. Application Data

(63) Continuation of application No. 18/175,076, filed on Feb. 27, 2023, now Pat. No. 12,208,635.

(51) Int. Cl.
*B41J 33/36* (2006.01)
*B41J 32/00* (2006.01)
(Continued)

(52) U.S. Cl.
CPC ............... *B41J 33/36* (2013.01); *B41J 32/00* (2013.01); *B41J 32/02* (2013.01); *B41J 33/14* (2013.01); *B41J 33/22* (2013.01); *B41J 33/34* (2013.01); *B41J 35/36* (2013.01); *B41J 2203/01* (2020.08); *G06K 15/10* (2013.01)

(58) Field of Classification Search
CPC ... B41J 33/36; B41J 32/00; B41J 32/02; B41J 33/14; B41J 33/22; B41J 33/34; B41J 35/36; B41J 2203/01; G06K 15/10
See application file for complete search history.

(56) References Cited

U.S. PATENT DOCUMENTS 4,698,567 A 10/1987 Gottwald et al.
4,777,609 A 10/1988 Cavill et al.
(Continued)

FOREIGN PATENT DOCUMENTS

DE 29701808 U1 1/1998
JP H07214849 8/1995

*Primary Examiner* — Geoffrey S Mruk
(74) *Attorney, Agent, or Firm* — Haynes and Boone, LLP

(57) ABSTRACT

Systems and methods related to adaptive ribbon speed control for a line matrix impact printer are provided. A ribbon cartridge includes a ribbon configured to be driven at a ribbon speed, and a ribbon gear configured to rotate with movement of the ribbon. The ribbon includes a ribbon joint patch detectable via a first sensor to determine a first ribbon speed of the ribbon. Rotation of the ribbon gear is detectable via a second sensor to determine a second ribbon speed of the ribbon. A target ribbon speed is determined based on at least one print job characteristic. A current ribbon speed is determined based on the first ribbon speed and the second ribbon speed. The ribbon speed is adjusted based on a difference between the current ribbon speed and the target ribbon speed. Associated systems and methods are also provided.

12 Claims, 9 Drawing Sheets

(51) Int. Cl.

| | |
|---|---|
| ***B41J 32/02*** | (2006.01) |
| ***B41J 33/14*** | (2006.01) |
| ***B41J 33/22*** | (2006.01) |
| ***B41J 33/34*** | (2006.01) |
| *B41J 35/36* | (2006.01) |
| *G06K 15/10* | (2006.01) |

(56) References Cited

U.S. PATENT DOCUMENTS

| | | | |
|---|---|---|---|
| 5,215,391 | A | 6/1993 | Daley et al. |
| 5,618,118 | A | 4/1997 | Matsumoto et al. |
| 5,685,653 | A | 11/1997 | Bringhurst |
| 5,902,057 | A | 5/1999 | Furrow et al. |
| 6,017,158 | A | 1/2000 | Conlan |
| 6,767,147 | B2 | 7/2004 | Jakubowski et al. |
| 12,208,635 | B2 * | 1/2025 | Chang ...................... B41J 33/34 |
| 2011/0070011 | A1 | 3/2011 | White |
| 2011/0176850 | A1 | 7/2011 | Moore |
| 2020/0130375 | A1 | 4/2020 | Ellis et al. |

* cited by examiner

ADAPTIVE RIBBON SPEED CONTROL SYSTEMS AND METHODS

CROSS REFERENCE TO RELATED APPLICATION

This application is a continuation of U.S. patent application Ser. No. 18/175,076, filed Feb. 27, 2023, now U.S. Pat. No. 12,208,635, issued on Jan. 28, 2025, all of which is incorporated by reference herein in its entirety.

TECHNICAL FIELD

The present disclosure relates generally to line matrix impact printers, and, more particularly, to systems and methods related to adaptive ribbon speed control for line matrix impact printers.

BACKGROUND

Line matrix impact printers use a ribbon system to transfer ink from an inked fabric strip to form dots by mechanical force that create printed graphics and letters. The print head of a line matrix impact printer includes multiple print elements with fine tips attached that are actuated by energized and de-energized magnetic field, and a shuttle system that moves back-and-forth in a defined width to print a dot-row in one sweep. The inked fabric strip contains a near-saturated amount of ink and is contained in a ribbon cartridge housing. The ink is transferred from the inked fabric strip to the print medium when the print medium is impacted by the tips of the print head.

BRIEF SUMMARY

Various embodiments of the present disclosure include a ribbon cartridge. The ribbon cartridge includes a ribbon configured to be driven at a ribbon speed, and a ribbon gear configured to rotate with movement of the ribbon. The ribbon includes a ribbon joint patch detectable via a first sensor to determine a first ribbon speed of the ribbon. Rotation of the ribbon gear is detectable via a second sensor to determine a second ribbon speed of the ribbon. A target ribbon speed is determined based on at least one print job characteristic. A current ribbon speed is determined based on the first ribbon speed and the second ribbon speed. The ribbon speed is adjusted based on a difference between the current ribbon speed and the target ribbon speed.

Various embodiments of the present disclosure include a system. The system includes a ribbon cartridge including a ribbon configured to be driven at a ribbon speed. The system further includes one or more ribbon speed sensors. The system further includes a logic device configured to determine a target ribbon speed based on at least one print job characteristic. The logic device is further configured to determine a current ribbon speed via the one or more ribbon speed sensors. The logic device is further configured to adjust the ribbon speed based on a difference between the current ribbon speed and the target ribbon speed.

Various embodiments of the present disclosure include a method. The method includes determining a target ribbon speed for a ribbon based on at least one print job characteristic. The method further includes determining a current ribbon speed of the ribbon via one or more ribbon speed sensors. The method further includes adjusting the ribbon speed based on a difference between the current ribbon speed and the target ribbon speed.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
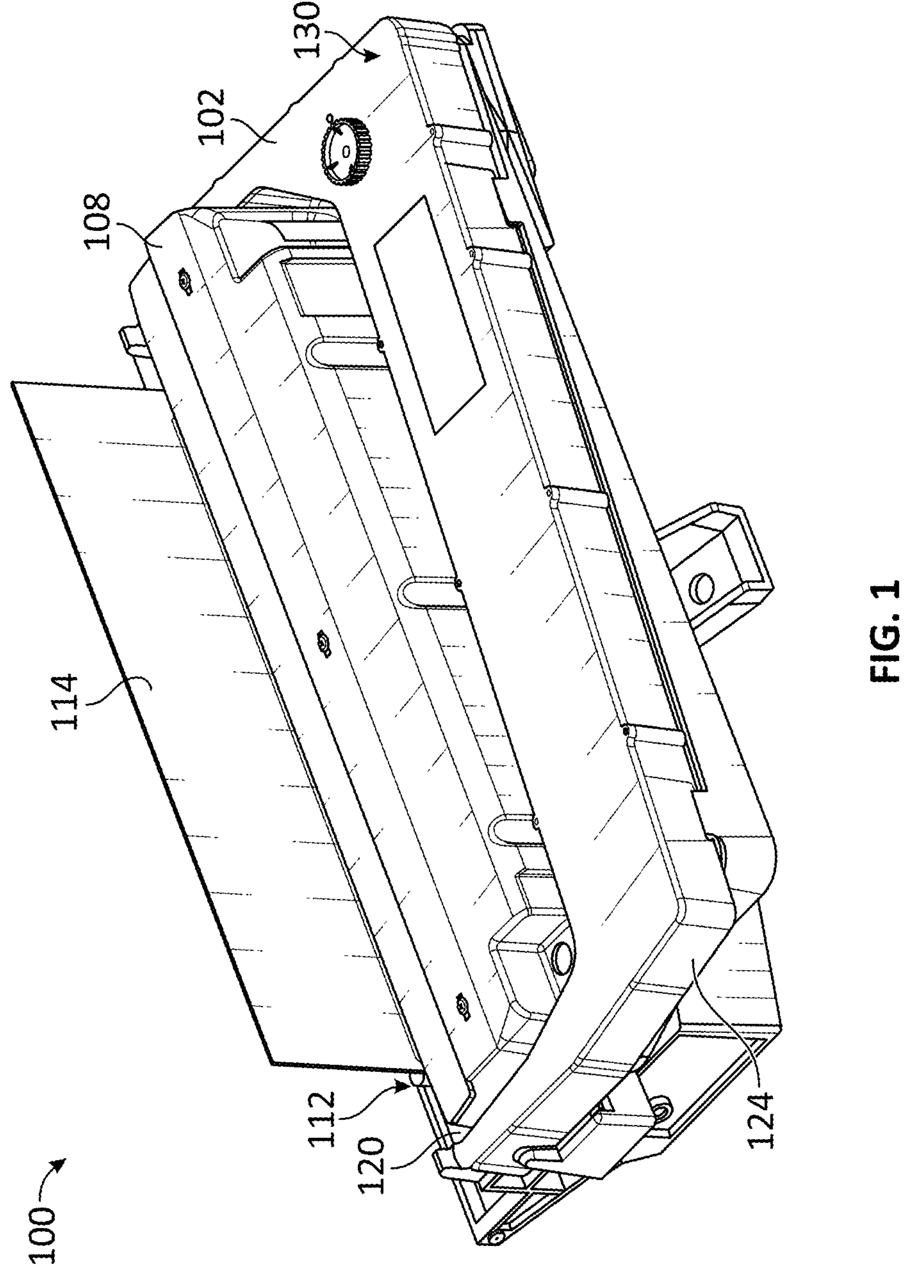
FIG. 1 is a diagram illustrating a line matrix impact printer with certain features removed for illustration purposes, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The usable life of a printer ribbon, such as for a line matrix impact printer, may be determined by a total of characters, symbols and/or graphics being printed until reaching a point when prints are no longer readable or have an acceptable print quality. As a result, the uniformity and darkness of the prints are two important attributes for users to determine the end of ribbon life.

Depending upon ribbon construction and ink properties, the total amount of the ink being released during the tip impact is controlled by the impact force and ink distribution contained by the ribbon fabric. Since the tip impact forces of all the print elements are nearly the same, the ink release is predominately determined by the ink diffusion within the fabric bulk and the fabric surface. Excessive overstriking in the same area of the ribbon fabric creates a condition that the ink consumption rate is faster than the replenishing rate and causes "lighter" dots between the first strike and subsequent strikes. For these areas that are subject to heavy multiple overstrikes, the resulting wears are also heavier than the average areas. The bulk construction and surface properties of these areas can be damaged at an earlier stage and slow down the ink release. To the extreme condition, the ink cannot be further released from these areas due to the usable paths for the ink diffusion being completely blocked. These damaged areas would eventually affect ribbon life and create uneven print darkness.

A constant ribbon speed used throughout ribbon life may render an acceptable average ribbon life that gives acceptable print darkness. However, print jobs may vary in terms of print formats, print contents, print coverages, and print durations. Thus, a constant ribbon speed may not be suitable to cover the conditions with excessive tip overstrikes on the same areas of the ribbon. In addition, a constant ribbon speed is also not optimized to reduce the total mechanical wears of the inked fabric that are caused by the excessive movements passing through the cartridge house and across the print head.

Based on printer speed and print resolution requirements, high-speed print heads may have more print elements (e.g., hammersprings) than lower-speed print heads, which are more prone to have more overstrikes. Low-resolution print heads have bigger tip sizes than high-resolution print heads, which typically print larger dots. These two factors promote more overlapping of the dots on the ribbon surface and require different ribbon speeds to achieve desirable print darkness and ribbon life.

Embodiments of the present disclosure may utilize variable ribbon speeds based on print requirements. For example, a target ribbon speed may be determined by the total print dots that are created by the tip impacts, per unit time (dot output rate) and the type of print head used, among other characteristics. To reduce possible tip overstrikes onto the same ribbon area, a faster ribbon speed may be proposed for print jobs that have a higher dot output rate, larger tip sizes, and a greater number of print elements. Conversely, a slower ribbon speed may be proposed for print jobs that have a lower dot output rate, smaller tip sizes, and a smaller number of print elements.

Movement of the print head can be either opposite to the ribbon direction or along the ribbon direction. Although the print head moving speed can be much faster than the ribbon moving speed, the counter direction of the print head movement may be prone to have more overstrikes than the movement in same direction. Thus, the target ribbon speed may be based on the worst case, which is based on counter direction. The hammerspring actuation speed may also affect the rate of overstrikes.

Ribbon fabric properties (e.g., woven density, yarn size and surface properties) may also be important factors affecting ink retention, ink release, and wear resistance, for instance. The effect of tip overstrikes on an inked fabric may also be more tolerable if the ink fabrics have better wear resistance and/or a better ink replenishing rate. Thus, the target ribbon speed may also be a function of the properties of the inked ribbon. Additionally, or alternatively, one or more properties of the ink may affect ribbon life. For example, an oil-based ink may have good affinity to the surfaces of the ribbon fabric.

An adaptive ribbon system may use these and other considerations to determine the target ribbon speed for the print job. A ribbon motion sensing system, which may operate in a closed loop, can facilitate ribbon speed accuracy to achieve the desirable results. The actual ribbon speed is calibrated and compensated by using multiple sensors that detect the actual ribbon motion and speed. For example, a first group of sensors determines the continuous motion of the ribbon and calculates ribbon speed. A second group of sensors calculates ribbon speed based on actual ribbon movement. From the data collected by these sensors, a change of ribbon motion may be detected, and one or more adjustments of motor speed may be made. In this manner, the adaptive ribbon system may dynamically adjust ribbon speed to deliver an optimal amount of ink from the ribbon based on the type of print job to achieve the acceptable print quality.

In various embodiments, one or more first sensors detect ribbon motion. One or more second sensors detect ribbon motion and speed. This multi-sensor system may provide input information to a control system (e.g., of a ribbon cartridge, of the printer, of a control system, etc.) to validate the ribbon speeds and make adjustment when necessary. If any sensor detects an interruption or abnormal change of ribbon movement, the printer may stop due to "ribbon stall." In embodiments, a warning message may be provided before ribbon stall has occurred. For example, if there is any mismatch of the speed or the absolute speed of each sensor below a threshold, an error message may be provided without stopping the printing to alert the user of possible ribbon failure and/or the change of print outputs before actual failure. If the ribbon speed cannot be corrected after allowable threshold limits, then the printer may be stopped.

FIG. 1 is a diagram illustrating a line matrix impact printer 100 (hereinafter "printer" without intent to limit) with certain features removed for illustration purposes, according to one or more embodiments of the disclosure. It is appreciated that printer 100 can be mounted on a stand or a base, or incorporated in a cabinet, although other configurations are contemplated. In embodiments, printer 100 may be supported within a base frame and/or otherwise be configured similar to the printer disclosed in U.S. Pat. No. 8,789,922 B2, the disclosure of which is incorporated by reference. For example, printer 100 may include a ribbon cartridge 102 and a print head including a shuttle 108 and a hammerbank 112, among other components, to produce letters and graphics in the form of a matrix of dots on a print medium 114.

Figures 4, 5:
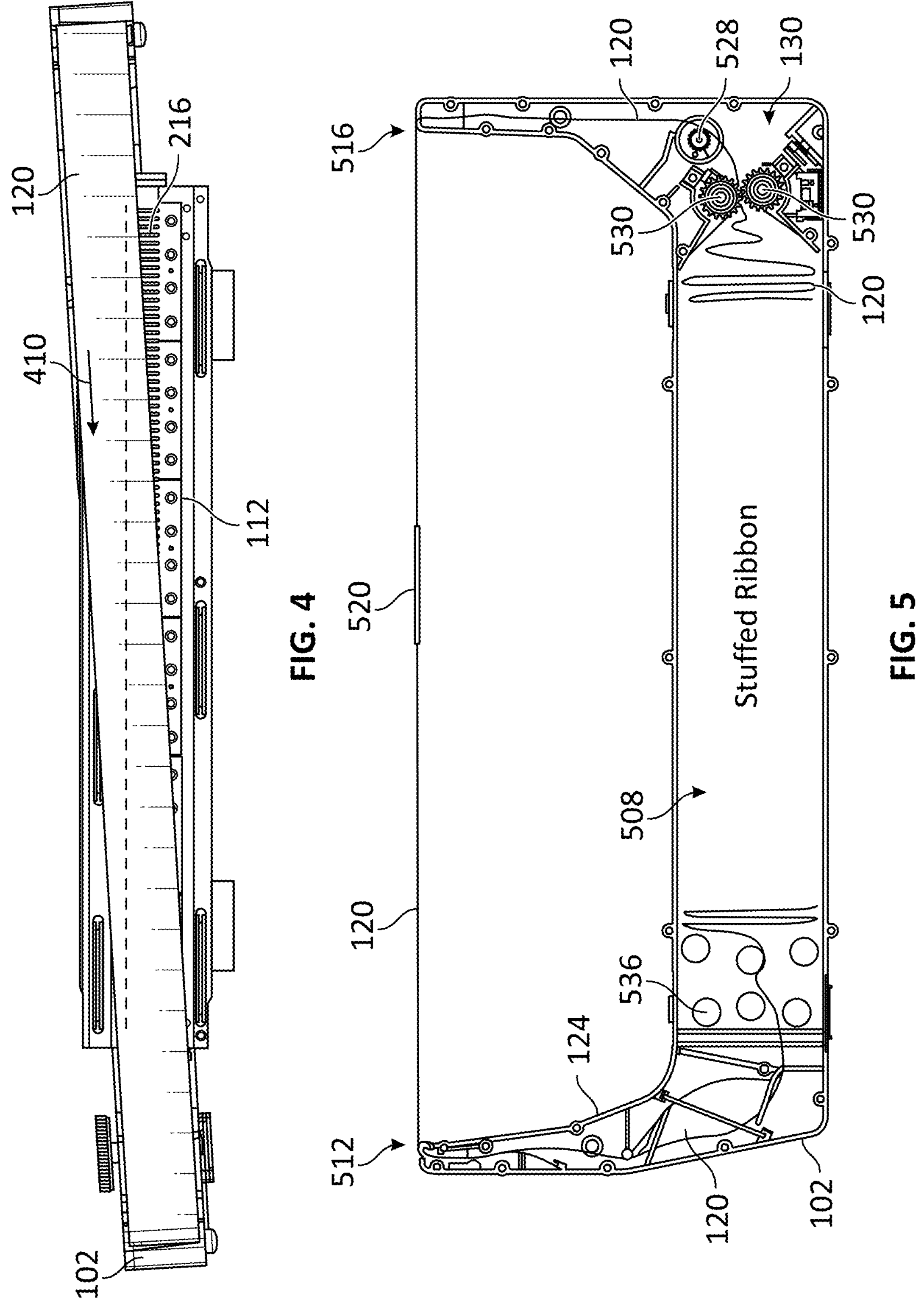
FIG. 4 is a diagram illustrating a position of the hammerbank in relation to a ribbon of a ribbon cartridge, according to one or more embodiments of the disclosure.
FIG. 5 is a diagram illustrating an internal view of the ribbon cartridge, according to one or more embodiments of the disclosure.

Ribbon cartridge 102 may include an "endless" or Mobius strip of ink ribbon 120 within a housing 124 that is fed across print medium 114 (e.g., paper, fabric, etc.) by a motor that creates tension on ribbon 120 by use of a drive system 130 (see FIG. 5). In one or more embodiments, drive system 130 includes one or more gears on one side and a tension spring on the opposite side of the cartridge (see FIG. 5). The ribbon cartridge 102 feeds ribbon 120 generally horizontally over print medium 114 to enable ink transfer from ribbon 120 to print medium 114 via hammerbank 112 to create printed images, graphics, etc., as detailed below.

Print medium 114 may include, for example, single sheets, fan-fold forms or continuous sheets, bar code labels, combinations of plastic and paper labels and formats, paper media for text and graphics, and other such materials. Print medium 114 may advance vertically over a support plate (not illustrated), such as by frictional wheels, sprocket drive "tractors," or other known media drive mechanisms. In embodiments, a knob may be provided to manually increment the vertical position of print medium 114 (e.g., for indexing or initial alignment of print medium 114, or for other purposes).

Shuttle 108 may incorporate one or more mechanisms (e.g., a scotch yoke mechanism) to drive hammerbank 112 back and forth over ribbon 120 and print medium 114 in a horizontal direction, such as laterally along print medium 114. For example, hammerbank 112 may be coupled to shuttle 108 for horizontal reciprocating movement by the shuttle 108 relative to vertically movable print medium 114. As described in more detail below, hammerbank 112 includes an inline row of printing tips ("hammers") which are selectively triggered (e.g., electromagnetically released) as shuttle 108 drives hammerbank 112 back and forth over ribbon 120 and print medium 114. For example, a printing tip may be triggered to impact print medium 114 through ribbon 120 to place a dot of ink on print medium 114, as detailed below.

Figure 2:
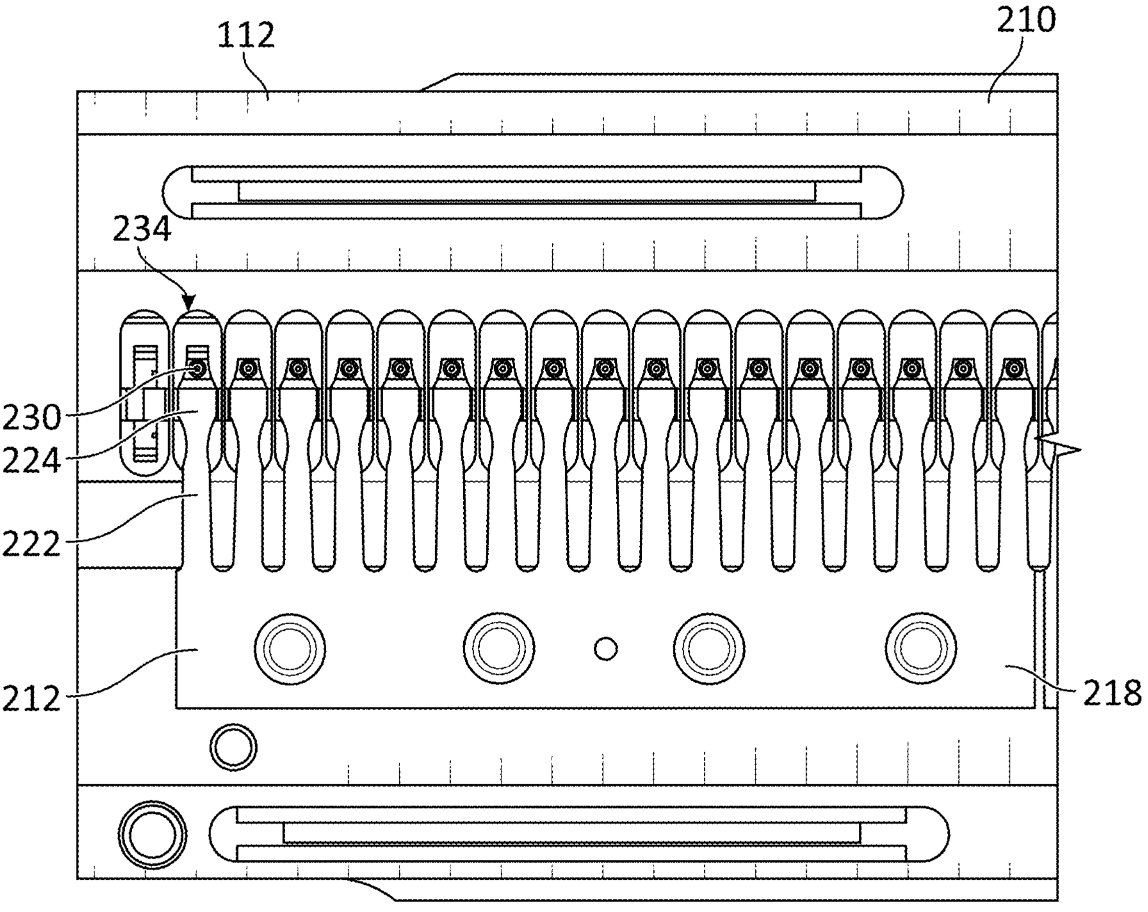
FIG. 2 is a diagram illustrating a partial front view of a hammerbank, according to one or more embodiments of the disclosure.
Figure 3:
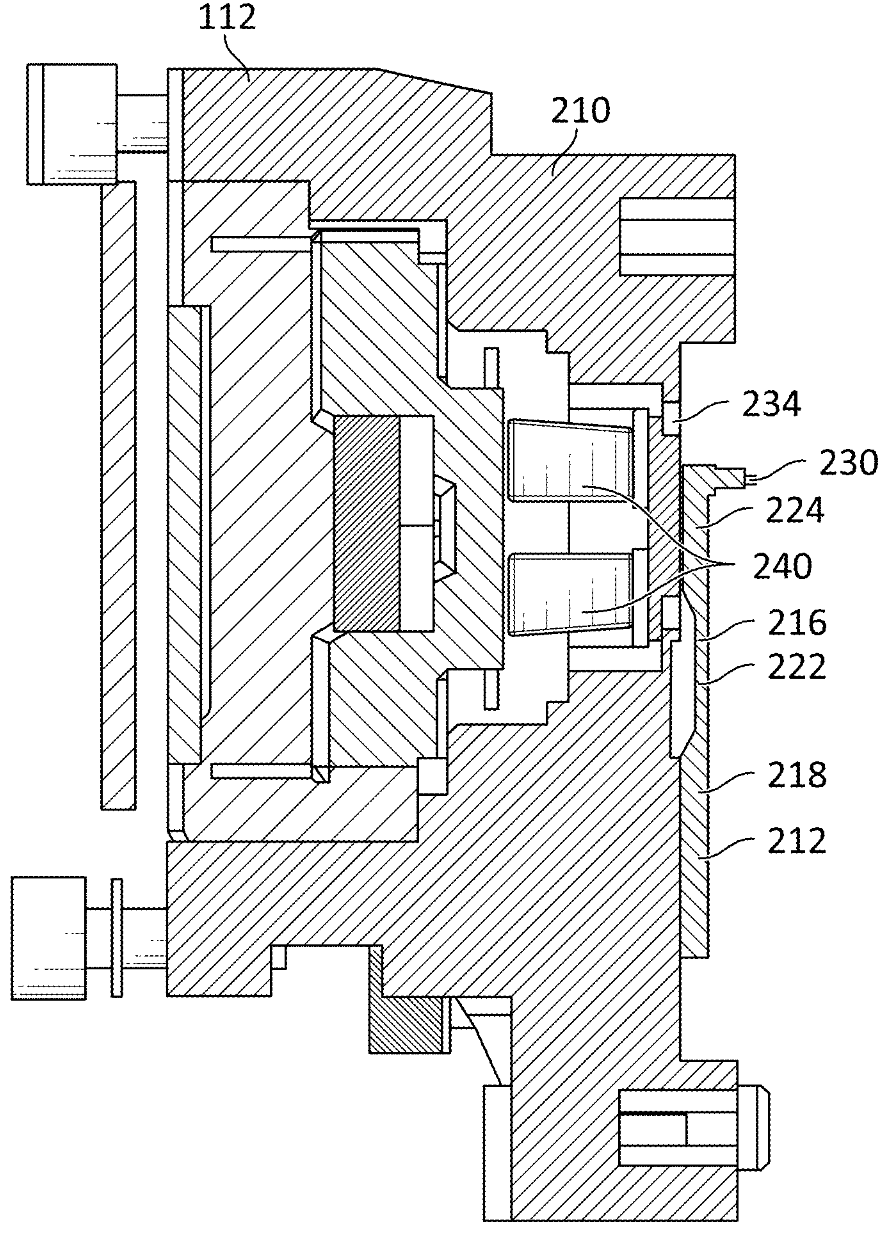
FIG. 3 is a diagram illustrating a sectional view of the hammerbank, according to one or more embodiments of the disclosure.

FIG. 2 is a diagram illustrating a partial front view of hammerbank 112, according to one or more embodiments of the disclosure. FIG. 3 is a diagram illustrating a sectional view of hammerbank 112, according to one or more embodiments of the disclosure. Referring to FIGS. 2-3, hammerbank 112 may be similar to those described in U.S. Pat. Nos. 6,146,033 and/or 6,437,280 B1, the disclosures of which are incorporated by reference. For instance, hammerbank 112 may include a body 210 having a fret 212 mounted thereto, with fret 212 including hammersprings 216 attached to or formed with a base portion 218. Base portion 218 may be attached to body 210 using mechanical fasteners (e.g., screws, bolts, etc.) or other fastening means.

As best illustrated in FIG. 3, a hammerspring 216 (e.g., each hammerspring 216) may include a first section 222 extending from base portion 218, and a terminal second section 224. For instance, first section 222 may be cantilevered from base portion 218. In embodiments, first section 222, which may be referred to as a spring finger, may include a spring portion formed as a necked-down portion terminating at second section 224. Second section 224, which may be referred to as a hammer head, may be an enlarged end portion including a print tip 230 (e.g., projecting forwardly therefrom). Print tip 230 may be brazed or fused to hammerspring 216, although other configurations are contemplated.

As best shown in FIG. 3, a cavity 234 may be formed behind hammerspring 216 to house a pair of pole pieces 240 connected to a magnet (e.g., a permanent magnet). The magnet may retain second section 224 of hammerspring 216 against pole pieces 240. For example, a magnetic flux created at least partially by pole pieces 240 and the magnet may act to pull second section 224 towards pole pieces 240 and against a forward bias exerted by first section 222. In embodiments, pole pieces 240 may include respective coils driven by a controller to control a release of hammerspring 216 from its retained position. For example, an electrical current may be passed through the coils to induce a magnetomotive force in the pole pieces 240 that interrupts the magnetic flux path, thereby releasing second section 224, and hence print tip 230, to spring forward to as to impact ribbon 120 and print a dot on print medium 114. In this manner, the cantilevered, magnetically retracted hammersprings 216 may be selectively triggered according to a determined timing to electromagnetically release and impact print medium 114 through ribbon 120.

FIG. 4 is a diagram illustrating a position of hammerbank 112 in relation to ribbon 120 of ribbon cartridge 102, according to one or more embodiments of the disclosure. Referring to FIG. 4, ribbon 120 may extend at an angle relative to hammersprings 216. For example, ribbon 120 may extend diagonally across the front of hammerbank 112 such that each hammerspring 216 contacts a different portion of ribbon 120 (e.g., a different print area of ribbon 120) compared to adjacent hammersprings 216. In this manner, ribbon wear may be reduced to prolong an operational life of ribbon cartridge 102. As shown, ribbon 120 may be driven across hammersprings 216 in a ribbon direction 410, such as at a ribbon speed. As described below, the ribbon speed may be adjusted dynamically to account for various print characteristics and/or further reduce ribbon wear, as desired.

FIG. 5 is a diagram illustrating an internal view of ribbon cartridge 102, according to one or more embodiments of the disclosure. Referring to FIG. 5, ribbon cartridge 102 may be similar to those described in U.S. Pat. Nos. 8,317,420 B2 and/or 8,714,849 B2, the disclosures of which are incorporated by reference. For example, housing 124 may hold most of ribbon 120 within a storage space 508 (e.g., with ribbon 120 folded within space 508). Ribbon 120 exits housing 124 at an outlet 512 and is pulled into housing 124 at an inlet 516, with ribbon 120 exposed for use to impart ink onto print medium 114 between outlet 512 and inlet 516. In embodiments, a ribbon joint patch 520 may join ends of ribbon 120 to create a loop of ink ribbon. Ribbon joint patch 520 may include various features such that the patch is detectable via a sensor. For example, ribbon joint patch 520 may have various visual (e.g., one or more colors, graphics, etc.), structural, or other features to distinguish ribbon joint patch 520 from other portions of ribbon 120.

In embodiments, drive system 130 includes various rollers, drives, gears, knobs, and other components to draw ribbon 120 into housing 124 through inlet 516 and fold or otherwise stuff ribbon 120 into space 508. For example, as shown in FIG. 5, ribbon cartridge 102 may include a ribbon gear 528 and a pair of drive gears 530. Drive gears 530 may at least partially mesh or otherwise grip ribbon 120 to frictionally pull ribbon 120 and drive ribbon 120 at a ribbon speed. Ribbon gear 528 may function as a feed roller or idler pulley and rotates as ribbon 120 is pulled into space 508 via drive gears 530.

In embodiments, ribbon cartridge 102 may include various features to control egress of ribbon 120 from space 508 and/or outlet 512. For instance, ribbon cartridge 102 may include one or more bumps 536 to facilitate unfolding of ribbon 120 as ribbon 120 exits space 508, such as in a manner as described in U.S. Pat. No. 8,317,420 B2. In embodiments, ribbon cartridge 102 may include various gates or other structures to flip ribbon 120 through a mobius twist, such as in a manner as described in U.S. Pat. No. 8,317,420 B2. In embodiments, ribbon 120 may pass through a pinch-point (e.g., a leaf spring flexed against a vertical rib edge in housing 124), which provides sufficient back-tension in ribbon 120 to ensure accurate translation through the print station. Ribbon 120 continues through the print station and back into inlet 516 and space 508, thus completing a loop.

Figure 6:
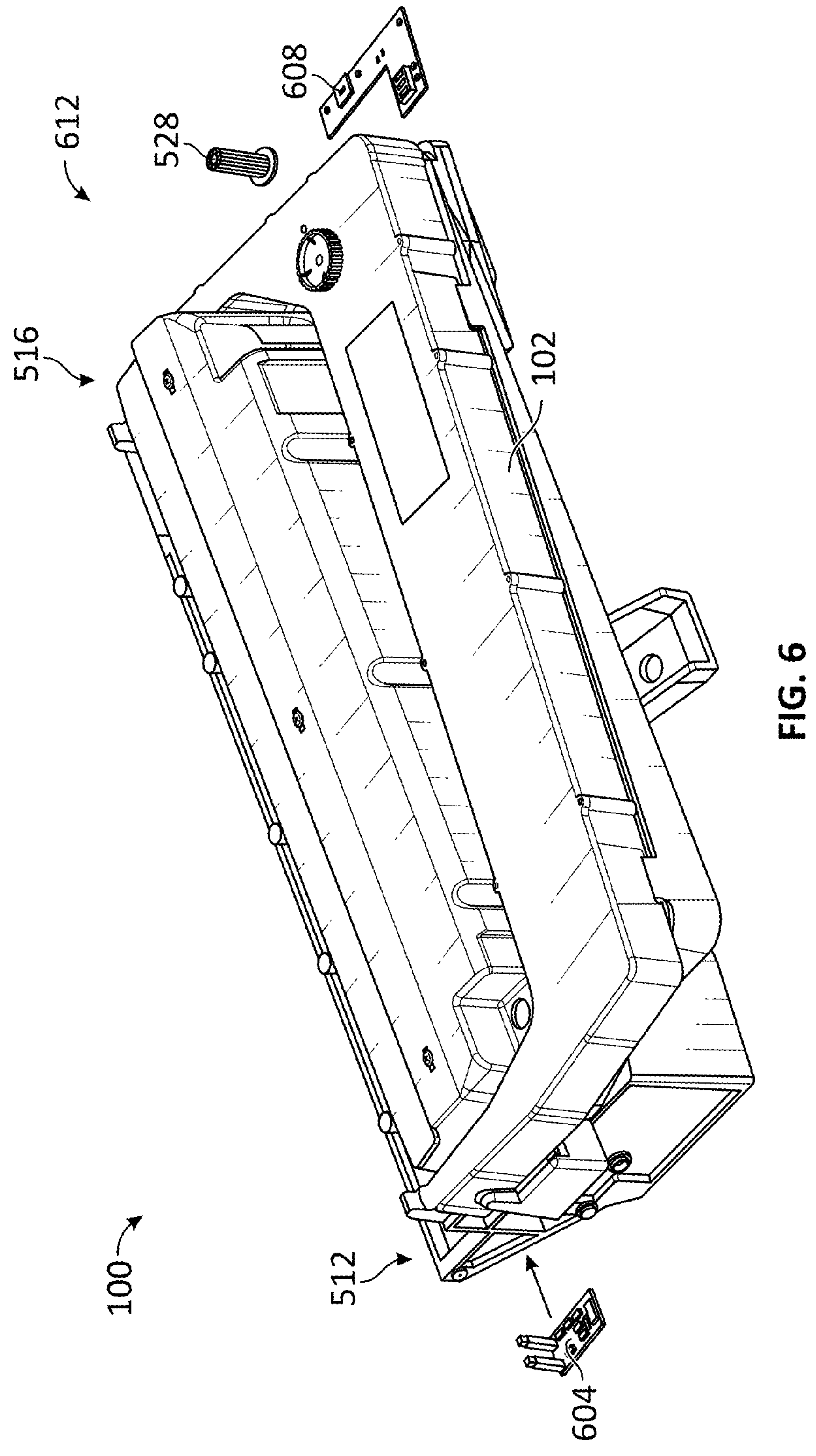
FIG. 6 is a diagram illustrating a sensor assembly associated with the ribbon cartridge, according to one or more embodiments of the disclosure.

FIG. 6 is a diagram illustrating a sensor assembly associated with ribbon cartridge 102 and with ribbon gear 528 removed from ribbon cartridge 102 for illustration purposes, according to one or more embodiments of the disclosure. Referring to FIG. 6, a first sensor 604 may be configured to detect ribbon joint patch 520 to determine a first ribbon speed of ribbon 120. For example, first sensor 604 may be an optical sensor configured to detect a visual characteristic of ribbon joint patch 520 as ribbon joint patch 520 passes through first sensor 604 (e.g., through a wavelength beam generated by first sensor 604). The first ribbon speed may be determined based on the time between patch detections and/or based on a length of time ribbon joint patch 520 is within a field of view of first sensor 604, among other methods. As shown, first sensor 604 may be positioned at or near outlet 512 of ribbon cartridge 102 to determine an exit speed of ribbon 120 from ribbon cartridge 102, although other configurations are contemplated.

With continued reference to FIG. 6, a second sensor 608 may be configured to detect rotation of ribbon gear 528 (or other portions of drive system 130) to determine a second ribbon speed of ribbon 120. For example, second sensor 608 may be a Hall sensor to detect a magnet attached to or formed with ribbon gear 528, although other configurations are contemplated. In the embodiment illustrated in FIG. 6, second sensor 608 is positioned at or near inlet 516 of ribbon cartridge 102 to determine an entry speed of ribbon 120 into ribbon cartridge 102.

Depending on the application, first sensor 604 and/or second sensor 608 may be included as part of ribbon cartridge 102 or another component of printer 100, as detailed below. For example, first sensor 604 and/or second sensor 608 may define at least a portion of a control system 612 included as part of ribbon cartridge 102 and/or printer 100. The first and second ribbon speeds (i.e., the exit and entry speeds of ribbon 120) may be compared, such as to validate the ribbon speeds, and a ribbon speed adjustment may be made when necessary. Additionally, or alternatively, if any of the two sensors detects an interruption or abnormal change of ribbon movement, a ribbon fault or stall may be determined, and a notification may be provided to a user. In embodiments, control system 612 may provide an early failure indication based on a comparison between the first and second ribbon speeds. For example, a mismatch between the first and second ribbon speeds below a threshold may cause control system 612 to provide an error message without stopping printing operations, thereby alerting the user of possible ribbon failure and/or a change in print output before actual failure occurs. If ribbon speed cannot be corrected after allowable threshold limits, control system 612 may cause printer 100 to stop printing.

Figure 7:
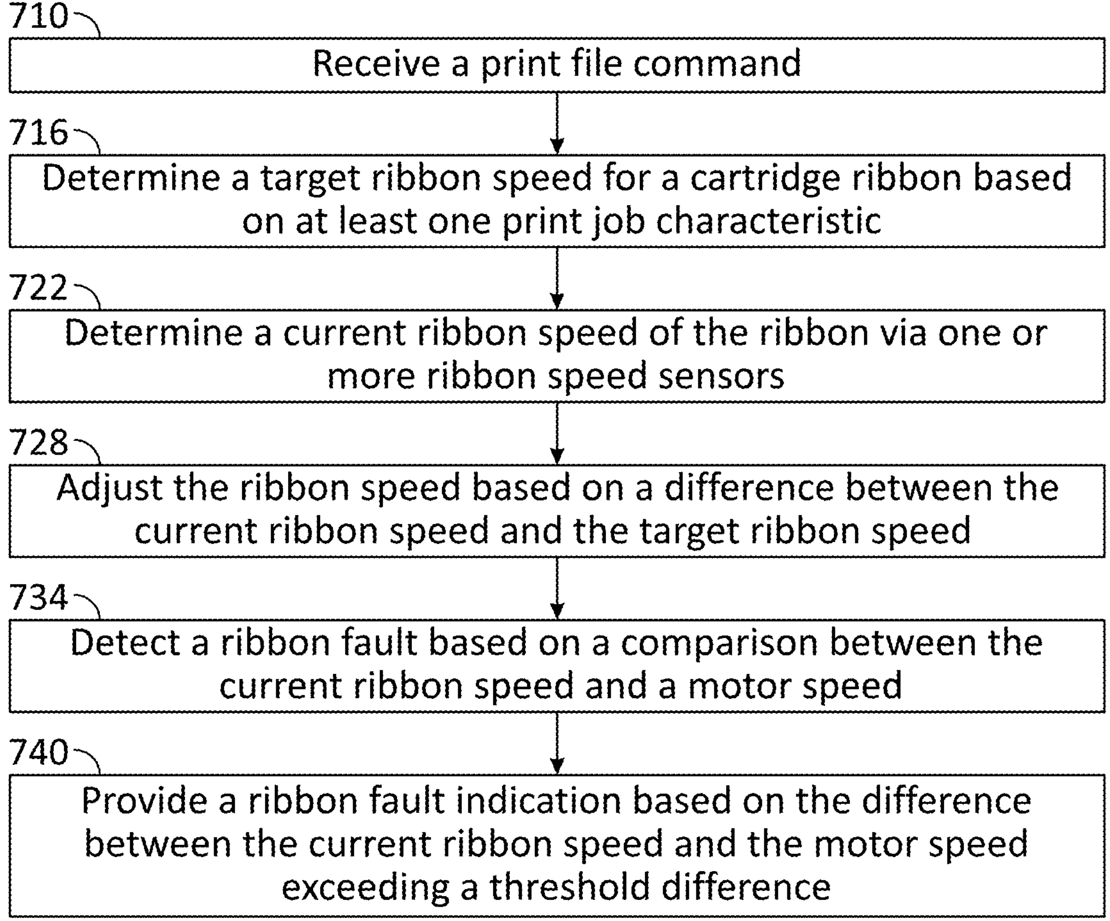
FIG. 7 is a flowchart of a method of adaptively controlling a ribbon speed, according to one or more embodiments of the disclosure.

FIG. 7 is a flowchart of a method 700 of adaptively controlling a ribbon speed, according to one or more embodiments of the disclosure. For explanatory purposes, method 700 is described herein with reference to FIGS. 1-6, although method 700 is not limited to the embodiments illustrated in FIGS. 1-6. Note that one or more operations in FIG. 7 may be combined, omitted, and/or performed in a different order as desired.

In block 710, method 700 includes receiving a print file command. The print file command may include data, commands, and other information configured to cause printer 100 to print letters and graphics in the form of a matrix of dots on print medium 114 using ribbon cartridge 102 and print head.

In block 716, method 700 includes determining a target ribbon speed for ribbon 120 based on at least one print job characteristic. For example, block 716 may include generating one or more commands to run print head and ribbon cartridge 102 based on the received print file command. Block 716 may include determining the target ribbon speed based on a total print dot rate to print medium speed, among other print job characteristics. Other print job characteristics used to determine the target ribbon speed may include a dot coverage rate, a print tip size, a print tip spacing, a ribbon cartridge property, a print medium property, an ink replenish rate, an ink consumption rate, an ink property, a shuttle speed, a shuttle direction, or any combination thereof.

In block 722, method 700 includes determining a current ribbon speed of ribbon 120 via one or more ribbon speed sensors. Block 722 may include determining the current ribbon speed via two or more sensors, such as first sensor 604 and second sensor 608. As described above, first sensor 604 may be configured to detect ribbon joint patch 520 of ribbon 120 (e.g., to determine an exit speed of ribbon 120). Second sensor 608 may be configured to detect the rotational speed of ribbon 120 gear (e.g., to determine an entry speed of ribbon 120). Such examples are illustrative only, and multiple sensors may be used to detect ribbon speeds at different locations within ribbon cartridge 102. The current ribbon speed may be calculated based on a combination (e.g., an average) of the determined entry speed and exit speed of ribbon 120.

In block 728, method 700 includes adjusting the ribbon speed based on a difference between the current ribbon speed and the target ribbon speed. For example, the ribbon speed may be increased based on the current ribbon speed being less than the target ribbon speed. Conversely, the ribbon speed may be decreased based on the current ribbon speed being greater than the target ribbon speed. In this manner, the ribbon speed may be adjusted dynamically during print operations to achieve a desirable ribbon speed based on print job requirements.

In block 734, method 700 includes detecting a ribbon fault based on a comparison between the current ribbon speed and a motor speed of drive system 130. For example, a ribbon fault may be detected based on a difference between the current ribbon speed and the motor speed. As described more fully below, a difference outside a threshold difference may indicate a ribbon fault.

In block 740, method 700 includes providing a ribbon fault indication based on the difference between the current ribbon speed and the motor speed exceeding the threshold difference. For instance, a message or other notification may be sent or otherwise provided to alert the user of actual and/or possible ribbon failure. In embodiments, block 740 may include providing a command to printer 100 to stop printing operations. Such examples are illustrative only, and other ribbon fault indications may be provided.

Figure 8:
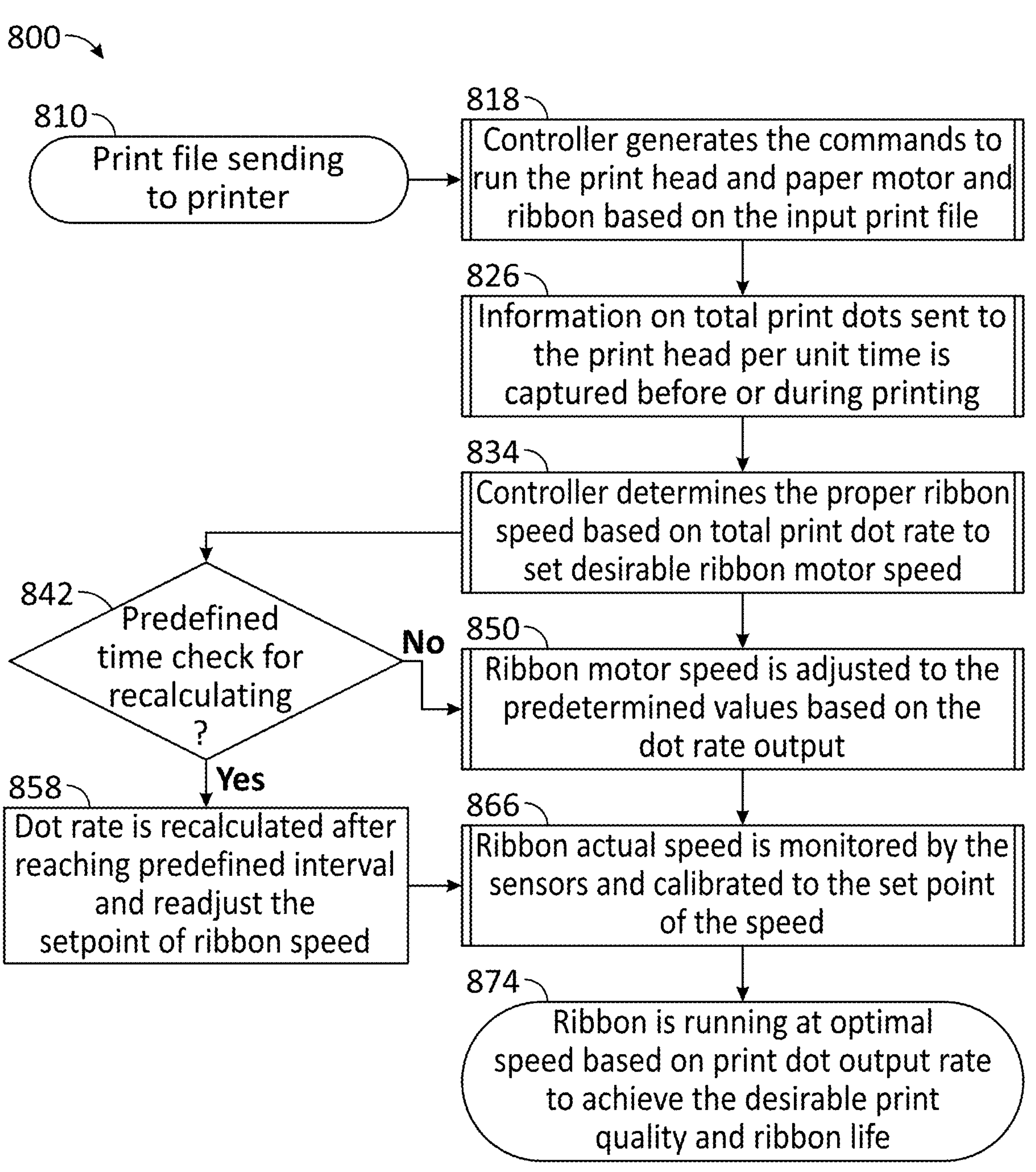
FIG. 8 is a flowchart of a method of adaptively controlling a ribbon speed to facilitate print quality and longer ribbon life, according to one or more embodiments of the disclosure.

FIG. 8 is a flowchart of a method 800 of adaptively controlling a ribbon speed to facilitate print quality and longer ribbon life, according to one or more embodiments of the disclosure. For explanatory purposes, method 800 is described herein with reference to FIGS. 1-6, although method 800 is not limited to the embodiments illustrated in FIGS. 1-6. Note that one or more operations in FIG. 8 may be combined, omitted, and/or performed in a different order as desired. In embodiments, one or more operations in FIG. 8 may be combined with method 700, described above.

In block 810, a print file is sent to printer 100. For example, a print file containing data, commands, and other information configured to cause printer 100 to print letters and graphics in the form of a matrix of dots on print medium 114 using ribbon cartridge 102 and print head may be sent to printer 100.

In block 818, a controller (e.g., a software algorithm running on printer 100) generates one or more commands to run print head, ribbon cartridge 102, a paper motor, etc. based on the input print file.

In block 826, information on total print dots sent to print head per unit time is captured before or during printing operations. For example, block 826 may include querying a look up table of total print dots sent to print head prior to printing operations. During printing operations, the total print dots sent to print head may be updated and/or analyzed separately.

In block 834, a controller (e.g., a software algorithm running on printer 100) determines the proper or target ribbon speed, such as in a manner as described herein. For instance, the proper or target ribbon speed may be determined based on total print dot rate, such as to set a desirable ribbon motor speed, etc.

In block 842, method 800 includes checking whether a predefined time has elapsed for recalculating the total print dot rate. If the predefined time has not elapsed, method 800 proceeds to block 850. If the predefined time has elapsed, method 800 proceeds to block 858.

In block 850, the ribbon speed is adjusted to the predetermined values based on the dot rate output (e.g., the values determined in block 834). In block 858, the dot rate output is recalculated after reaching the predefined time interval, and the ribbon speed setpoint is readjusted based on the updated dot rate output.

In block 866, the actual ribbon speed is monitored by one or more sensors (e.g., first sensor 604 and/or or second sensor 608), such as in a manner as described herein. Additionally, or alternatively, in block 866, the actual ribbon speed is calibrated to the speed set point.

In block 874, the ribbon 120 is running at an optimal speed based on print dot output rate to achieve a desirable print quality and ribbon life.

Figure 9:
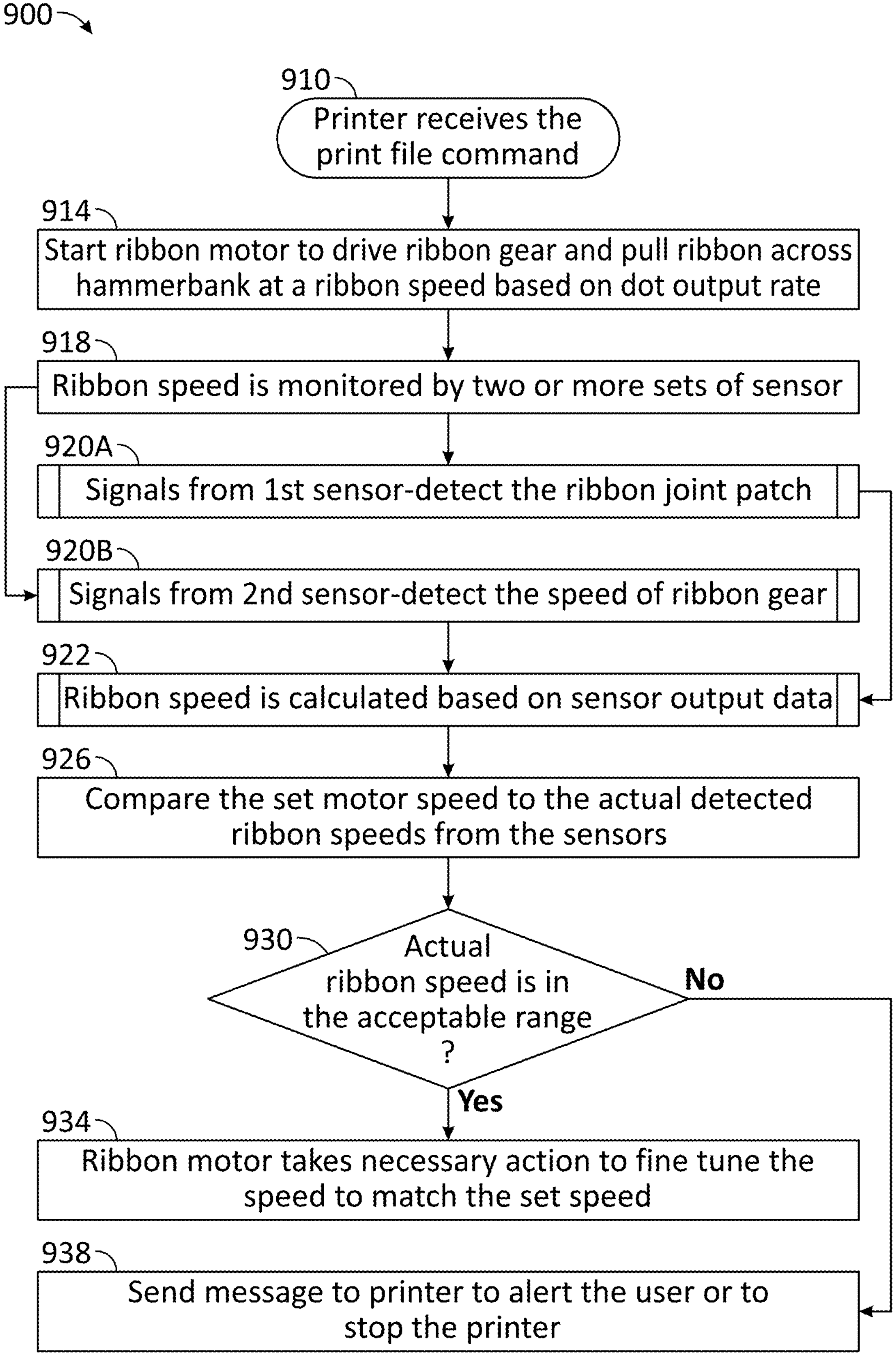
FIG. 9 is a flowchart of a method of detecting a ribbon fault, according to one or more embodiments of the disclosure

FIG. 9 is a flowchart of a method 900 of detecting a ribbon fault, according to one or more embodiments of the disclosure. In embodiments, method 900 may be part of a ribbon fault early detection system, such as to warn a user of potential ribbon faults based on abnormal ribbon speeds and before actual fault occurs, as detailed herein. For explanatory purposes, method 900 is described herein with reference to FIGS. 1-6, although method 900 is not limited to the embodiments illustrated in FIGS. 1-6. Note that one or more operations in FIG. 9 may be combined, omitted, and/or performed in a different order as desired. In embodiments, one or more operations in FIG. 9 may be combined with method 700 and/or method 800, described above.

In block 910, method 900 includes receiving a print file command. The print file command may include data, commands, and other information configured to cause printer 100 to print letters and graphics in the form of a matrix of dots on print medium 114 using ribbon cartridge 102 and print head.

In block 914, method 900 includes operating printer 100 based on the received print file command. For example, drive system 130 may be operated to pull ribbon 120 across hammerbank 112 at a ribbon speed (e.g., determined based on dot output rate, etc.), such as in a manner as described above. In embodiments, block 914 includes starting a ribbon motor to drive ribbon gear 528 across hammerbank 112 at a ribbon speed set by a controller (e.g., by a software algorithm running on printer 100, etc.) based on dot output rate, as described herein.

In block 918, method 900 includes monitoring ribbon speed using two or more sets of sensors. For example, in block 920A, signals from first sensor 604 are used to detect ribbon joint patch 520, as described above. In block 920B, signals from second sensor 608 are used to detect the rotational speed of ribbon gear 528, as described above.

In block 922, method 900 includes calculating a current ribbon speed based on sensor output data from first sensor 604 and second sensor 608. For example, the linear speed of ribbon 120 at or near inlet 516 or ribbon cartridge 102 may be determined based on the detected rotational speed of ribbon gear 528. Additionally, or alternatively, the linear speed of ribbon 120 at or near outlet 512 of ribbon cartridge 102 may be determined based on the detected presence of ribbon joint patch 520. The current ribbon speed may be calculated based on a combination (e.g., an average) of the determined entry speed and the exit speed of ribbon 120.

In block 926, method 900 includes comparing the current ribbon speed to a motor speed of a ribbon drive system (e.g., drive system 130). For example, block 926 may include calculating a difference between the current ribbon speed and the motor speed, although other configurations are contemplated.

In block 930, method 900 includes determining whether the difference calculated in block 926 is within an acceptable range. For instance, block 930 may include determining whether the difference is within a predetermined threshold difference. If the difference is within the threshold difference, method 900 may proceed to block 934. If the difference is outside the threshold difference, method 900 may proceed to block 938.

In block 934, method 900 includes dynamically adjusting the ribbon speed to match the set or target speed. For example, a motor may be adjusted to fine tune the ribbon speed, as desired, such as in a manner as described herein.

In block 938, method 900 includes providing a ribbon fault indication. For instance, a message or other notification may be sent or otherwise provided to alert the user of actual and/or possible ribbon failure. In embodiments, block 938 may include providing a command to printer 100 to stop printing operations.

Figure 10:
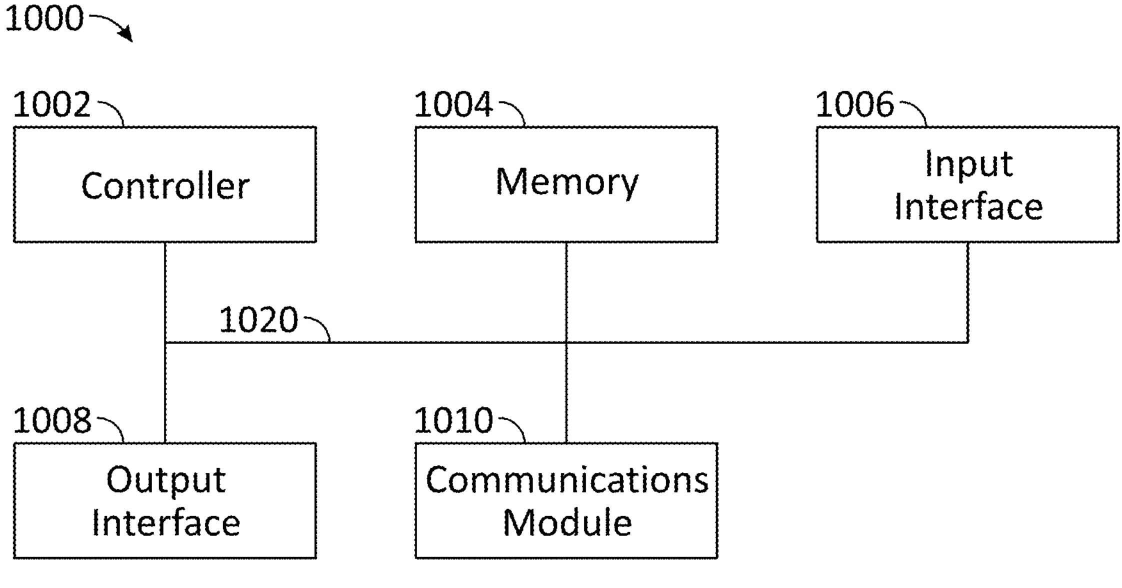
FIG. 10 is a diagram illustrating an example computing or processing system, according to one or more embodiments of the disclosure.

FIG. 10 is a diagram illustrating an example computing or processing system 1000 in which embodiments of the present disclosure may be implemented, according to one or more embodiments of the disclosure. For example, control system 612, described above, may be implemented using system 1000. In some embodiments, method 700 of FIG. 7, method 800 of FIG. 8, and/or method 900 of FIG. 9, described above, may be implemented using system 1000. System 1000 can be or include a computer, phone, PDA, tablet, server, controller, or any other type of electronic device. Such an electronic device includes various types of computer readable media and interfaces for various other types of computer readable media. As shown in FIG. 9, system 1000 includes a controller 1002, a memory 1004, an input interface 1006, an output interface 1008, and a communications module 1010.

Controller 1002, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 1002 may be configured to interface and communicate with the various other components of system 1000 to perform such operations. For example, controller 1002 may be configured to receive and process data received from a network and/or one or more sensors (e.g., sensors 118), store the data in memory 1004, and/or retrieve stored data from memory 1004.

Controller 1002 may include combinations of hardware and software processing functionality and may be provided with/in and/or communicatively attached to other components to execute appropriate instructions, such as software instructions and/or processing parameters stored in memory

1004. In various embodiments, controller 1002 may be configured to execute software instructions stored in memory 1004 to perform various methods, processes, or operations in the manner described herein.

Memory 1004 includes, in one embodiment, one or more memory devices configured to store data and information, including magnetic flux data and position information. The memory 1004 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, controller 1002 may be configured to execute software instructions stored in memory 1004 to perform method 700 and process steps and/or operations. Controller 1002 may be configured to store data in memory 1004.

Input interface 1006 includes, in one embodiment, a user input and/or an interface device, such as one or more controls, knobs, buttons, slide bars, keyboards, sensors, cameras, and/or other devices, that are adapted to generate an input control signal. Controller 1002 may be configured to sense the input control signals from input interface 1006 and respond to any sensed input control signals received therefrom. Controller 1002 may be configured to interpret such an input control signal as a value, as generally understood by one skilled in the art. In one embodiment, input interface 1006 may include a control unit (e.g., a wired or wireless handheld control unit) having push buttons adapted to interface with a user and receive user input control values. In one implementation, the push buttons of the control unit may be used to control various system functions.

Output interface 1008 may enable, for example, the output of data or other information. Output interface 1008 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 1002 may be configured to render data and information on output interface 1008. For example, controller 1002 may be configured to render data on output interface 1008, such as data stored in memory 1004.

In some embodiments, various components of system 1000 may be distributed and in communication with one another over a network. In this regard, communications module 1010 may be configured to facilitate wired and/or wireless communication among various system components over the network. Such a network may include, for example, a local area network ("LAN"), such as an Intranet, or a wide area network ("WAN"), such as the Internet.

In embodiments, various components of system 1000 may be communicatively connected via a system communications bus 1020. Bus 1020 collectively represents all system, peripheral, and chipset buses that communicatively connect the numerous devices of system 1000. For instance, bus 1020 may communicatively connect controller 1002, memory 1004, input interface 1006, output interface 1008, communications module 1010, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A ribbon cartridge comprising:

a ribbon configured to be driven at a ribbon speed, the ribbon comprising a ribbon joint patch detectable via a first sensor to determine a first ribbon speed of the ribbon; and a ribbon gear configured to rotate with movement of the ribbon, wherein rotation of the ribbon gear is detectable via a second sensor to determine a second ribbon speed of the ribbon;

wherein a target ribbon speed is determined based on at least one print job characteristic;

wherein a current ribbon speed is determined based on the first ribbon speed and the second ribbon speed; and wherein the ribbon speed is adjusted based on a difference between the current ribbon speed and the target ribbon speed.

2. The ribbon cartridge of claim 1, further comprising a logic device configured to:

determine the target ribbon speed and the current ribbon speed;

adjust the ribbon speed based on the difference between the current ribbon speed and the target ribbon speed; and detect a ribbon fault based on a comparison between the current ribbon speed and a motor speed of a drive system.

3. The ribbon cartridge of claim 2, wherein the logic device is further configured to:

provide a ribbon fault indication based on a difference between the current ribbon speed and the motor speed exceeding a threshold difference; or adjust the ribbon speed based on a detected degradation of the ribbon.

4. The ribbon cartridge of claim 1, wherein:

the first sensor is configured to detect the ribbon joint patch; and the second sensor is configured to detect the rotation of the ribbon gear.

5. The ribbon cartridge of claim 1, wherein:

the first sensor comprises an optical sensor; and the second sensor comprises a Hall sensor.

6. The ribbon cartridge of claim 1, wherein the first sensor is located at an entry location of the ribbon into the ribbon cartridge and the second sensor is located at an exit location of the ribbon out of the ribbon cartridge.

7. A system comprising:

a ribbon cartridge comprising:

a ribbon configured to be driven at a ribbon speed, the ribbon comprising a ribbon joint patch detectable via a first sensor to determine a first ribbon speed of the ribbon; and a ribbon gear configured to rotate with movement of the ribbon, wherein rotation of the ribbon gear is detectable via a second sensor to determine a second ribbon speed of the ribbon, wherein a target ribbon speed is determined based on at least one print job characteristic, wherein a current ribbon speed is determined based on the first ribbon speed and the second ribbon speed, and wherein the ribbon speed is adjusted based on a difference between the current ribbon speed and the target ribbon speed; and at least portions of a line matrix impact printer.

8. The system of claim 7, wherein the ribbon cartridge further comprises a logic device configured to:

determine the target ribbon speed and the current ribbon speed;

adjust the ribbon speed based on the difference between the current ribbon speed and the target ribbon speed; and detect a ribbon fault based on a comparison between the current ribbon speed and a motor speed of a drive system.

9. The system of claim 8, wherein the logic device is further configured to:

provide a ribbon fault indication based on a difference between the current ribbon speed and the motor speed exceeding a threshold difference; or adjust the ribbon speed based on a detected degradation of the ribbon.

10. The system of claim 7, wherein:

the first sensor is configured to detect the ribbon joint patch; and the second sensor is configured to detect the rotation of the ribbon gear.

11. The system of claim 7, wherein:

the first sensor comprises an optical sensor; and the second sensor comprises a Hall sensor.

12. The system of claim 7, wherein the first sensor is located at an entry location of the ribbon into the ribbon cartridge and the second sensor is located at an exit location of the ribbon out of the ribbon cartridge.

* * * * *